(12) United States Patent
Klein et al.

(10) Patent No.: US 11,310,037 B2
(45) Date of Patent: Apr. 19, 2022

(54) CLOUD CONTAINER SECURITY FRAMEWORK

(71) Applicant: SAP SE, Walldorf (DE)

(72) Inventors: Udo Klein, Oftersheim (DE); Richard Lindner, Heidelberg (DE)

(73) Assignee: SAP SE, Walldorf (DE)

( * ) Notice: Subject to any disclaimer, the term of this patent is extended or adjusted under 35 U.S.C. 154(b) by 40 days.

(21) Appl. No.: 16/932,197

(22) Filed: Jul. 17, 2020

(65) Prior Publication Data

US 2022/0021523 A1 Jan. 20, 2022

(51) Int. Cl.
*H04L 9/08* (2006.01)
*G06F 9/455* (2018.01)
*H04L 67/1097* (2022.01)
*H04L 29/06* (2006.01)

(52) U.S. Cl.
CPC ............ *H04L 9/0825* (2013.01); *G06F 9/455* (2013.01); *H04L 9/0894* (2013.01); *H04L 63/0435* (2013.01); *H04L 67/1097* (2013.01)

(58) Field of Classification Search
CPC .................................................... H04L 9/0825
See application file for complete search history.

(56) References Cited

U.S. PATENT DOCUMENTS

| | | | |
|---|---|---|---|
| 2019/0146816 A1* | 5/2019 | Reno | G06F 9/45558 718/1 |
| 2021/0006402 A1* | 1/2021 | Ohms | H04L 9/3247 |
| 2021/0266148 A1* | 8/2021 | Tsirkin | H04L 9/0897 |

* cited by examiner

*Primary Examiner* — Esther B. Henderson
(74) *Attorney, Agent, or Firm* — Erise IP, P.A.

(57) ABSTRACT

A containerized application is initialized in a cloud-based computing environment. Thereafter, the containerized application obtains environment variables encapsulating credentials. The containerized application stores the environment variables in a secret store of the containerized application. The environment variables are later wiped upon completion of the storing of the environment variables. Related apparatus, systems, techniques and articles are also described.

20 Claims, 4 Drawing Sheets

CLOUD CONTAINER SECURITY FRAMEWORK

TECHNICAL FIELD

The subject matter described herein relates to enhanced techniques for securing containers within a cloud platform executing applications.

BACKGROUND

Cloud platforms are increasingly packaging applications into generic containers. A container, in this regard, can be characterized as a standard unit of software that packages up code and all its dependencies so the corresponding application can run quickly and reliably from one computing environment to another computing environment including a cloud-based computing environment. Containers are advantageous in that they provide a logical packaging mechanism in which applications can be abstracted from the environment in which they actually run.

A container image comprises a lightweight, standalone, executable package of software that includes everything needed to run an application including, for example, code, runtime, system tools, system libraries and settings. A container image becomes a container at runtime.

Typically, a cloud-based application will require several prepackaged containers for purposes such as routing requests, application logic, deployment tasks, and data persistence. Access to these prepacked containers will require specific confidential parameters. These parameters can include, for example, information as to which other containers can be connected to, where to find them and how to authenticate them. Prepackaged containers do not always contain the credentials required to connect to the other containers. Instead, the credentials must be provided to the containers at runtime which can require the exposure of such credentials through environment variables. This exposure poses a security risk.

With some cloud platforms, environment variables are globally accessible inside the code base and inside the container. In addition, the credentials are often stored in plain textual format. As a result, any entity that gains access to the environment variables will be able to gain access to all other containers or systems that are reachable from within the container. Typically this will include the database/persistency and often third party systems. The issue is amplified by the fact that many pieces of code can provide some diagnostics facilities that tend to easily expose environment variables.

SUMMARY

In a first aspect, a containerized application is initialized in a cloud-based computing environment. Thereafter, the containerized application obtains environment variables encapsulating credentials. The containerized application stores the environment variables in a secret store of the containerized application. The environment variables are later wiped upon completion of the storing of the environment variables.

The secret store can be internal data storage of the application.

The environment variables can be encrypted within the secret store. In some variations, the encrypted environment variables can be spread within memory utilized by the secret store to obfuscate the encrypted environment variables.

The environment variables can include access credentials to the containerized application.

When some or all of the environment variables are encrypted, the containerized application can decrypt the encrypted environment variables using a corresponding symmetric key.

In addition or in the alternative, when some or all of the environment variables are encrypted, a public decryption key can be injected into a filesystem of the cloud-based computing network. The filesystem can provide the public decryption key to the containerized application so that the containerized application can decrypt the data encapsulated within the environment variables using the provided public decryption key.

In some variations, the environment variables can include a public decryption key. In such cases, an encrypted secret can be injected into a filesystem of the cloud-based computing environment. Thereafter, the filesystem can provide the encrypted secret to the containerized application so that the containerized application can decrypt the encrypted secret using the provided public decryption key.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, by assuming that parts of a container might be not trustworthy, the current subject matter establishes a second line of defense in case an attacker compromising part of a container. Instead of just reading some easily accessible environment variables to exfiltrate container secrets, an attacker now needs to gain basically full control of the runtime including its class/module load mechanism.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter provides enhanced techniques for cloud-based platforms executing applications which mitigate the risks of leaking the secret credentials to outside parties. In particular, various approaches are described below that each require varying degrees of effort to implement or attack.

Figure 1:
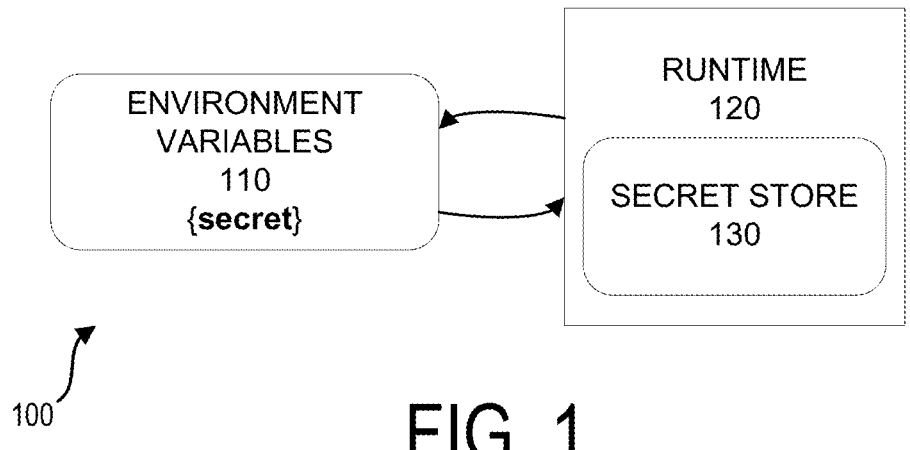
FIG. 1 is a first diagram illustrating a containerized application accessing environment variables.

FIG. 1 is a diagram 100 illustrating an arrangement directed to an approach with VCAP_SERVICES which is an environment variable used by a Platform as a service (PaaS) contract/convention to communicate all service credentials to an application running on a cloud platform. The goal of this arrangement is to minimize the exposure through the environment variables 110 in time. Environment variables 110, in this regard, are the means by which a cloud platform communicates information about its environment to a deployed containerized application 120. At start up, a containerized application 120 executing in the cloud platform will read the VCAP_SERVICES environment variables 110. The environment variable can be kept internally by the containerized application 120, for example, in a secret store 130 (i.e., a data store). The secret store 130 can be internal storage to the application which is not easily accessible and, in some variations, audited (i.e., including a mechanism for logging access, etc.). This secret store 130 can keep the data contained therein encrypted and scattered in memory (to further obfuscate the underlying values). Access to the data in the secret store 130 can be limited with language-specific features (e.g., closures for JAVASCRIPT or access modifiers for JAVA, etc.).

Figure 2:
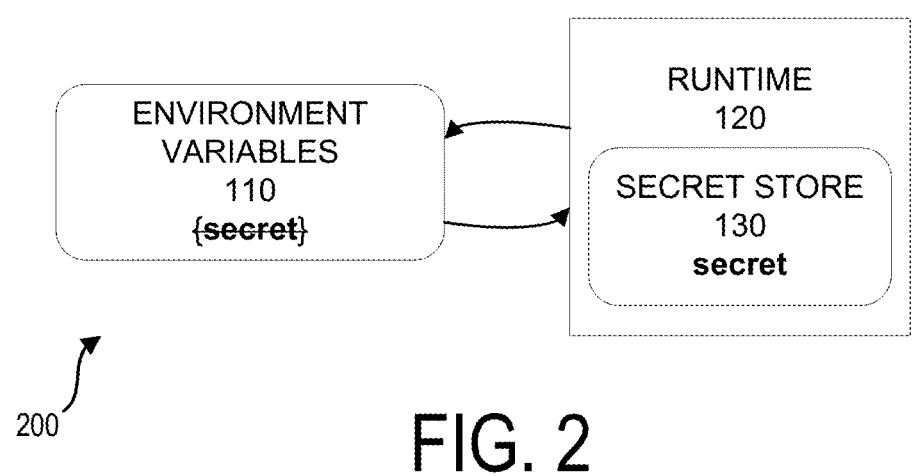
FIG. 2 is a second diagram illustrating a containerized application accessing environment variables.

Referring to diagram 200 of FIG. 2, once the secret store 130 is initialized and the environment variables 110 are stored therein, the containerized application 120 can wipe the VCAP_SERVICES environment variable because it does not need it anymore. After the initialization phase, exposure of VCAP_SERVICES is more or less mitigated.

Figure 3:
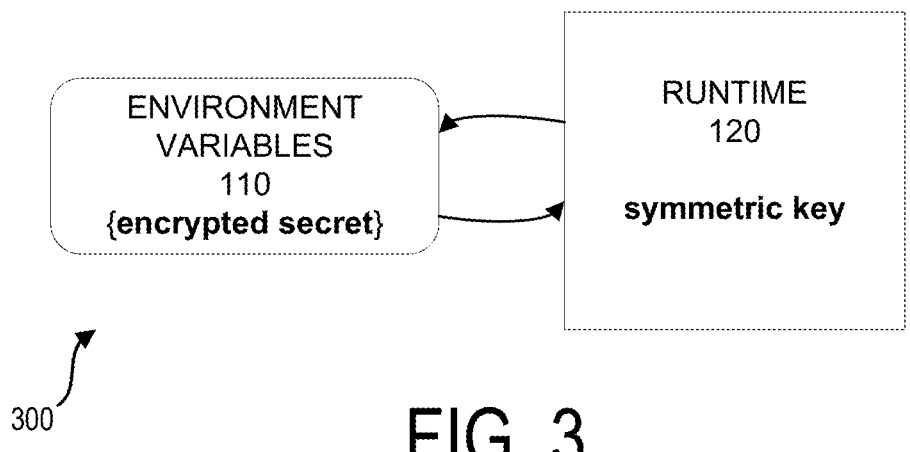
FIG. 3 is a third diagram illustrating a containerized application accessing environment variables.

FIG. 3 is a diagram 300 directed to an arrangement to an alternative VCAP_SERVICES approach with symmetric keys. In order to mitigate there being a short period of time during which the VCAP_SERVICES may expose secrets (i.e., when providing the environment variables 110 to the runtime), each containerized application 120 can comprise a symmetric cryptographic key. The containerized application 120 can get this key during its build phase. At runtime, the containerized application 120 will get the secrets in the VCAP_SERVICES encrypted which can then be decrypted by the containerized application 120 using the symmetric key. Thus an attacker would now need both the VCAP_SERVICES environment variables 110 content and the key hidden inside the container. The VCAP_SERVICES environment variables 110 can wiped after start up and the secrets will be kept encrypted and scattered in memory.

Figure 4:
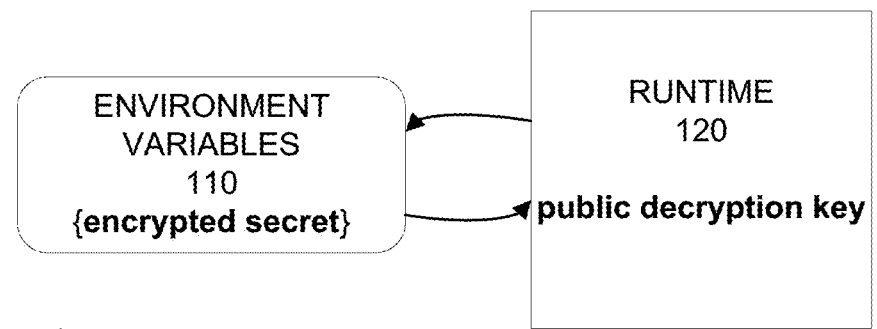
FIG. 4 is a fourth diagram illustrating a containerized application accessing environment variables.

FIG. 4 is a diagram 400 illustrating a VCAP_SERVICES approach with asymmetric keys. As a further security layer, the symmetric key may be replaced by a public/private key pair. The containerized application 120 will get the public decryption key during its build phase. At runtime, the containerized application 120 will get the secrets in the VCAP_SERVICES environment variables 120 encrypted with the private key. The containerized application 120 can then decrypt the encrypted secrets using its corresponding public decryption key. Thus an attacker would need both the VCAP_SERVICES environment variables 120 content and the public key hidden inside the containerized application 120. The VCAP_SERVICES environment variables 110 can be wiped after start up and the secrets will be kept encrypted and scattered in memory after decryption.

Note, the containerized application 120 is only given access to a public key. This is because it is assumed that the management infrastructure should be trusted more than the containers. Hence, the management infrastructure will keep the private keys and the containers only get a "public" key. With this arrangement, if a container should get breached, the obtained information cannot be used to create fake credentials.

Figure 5:
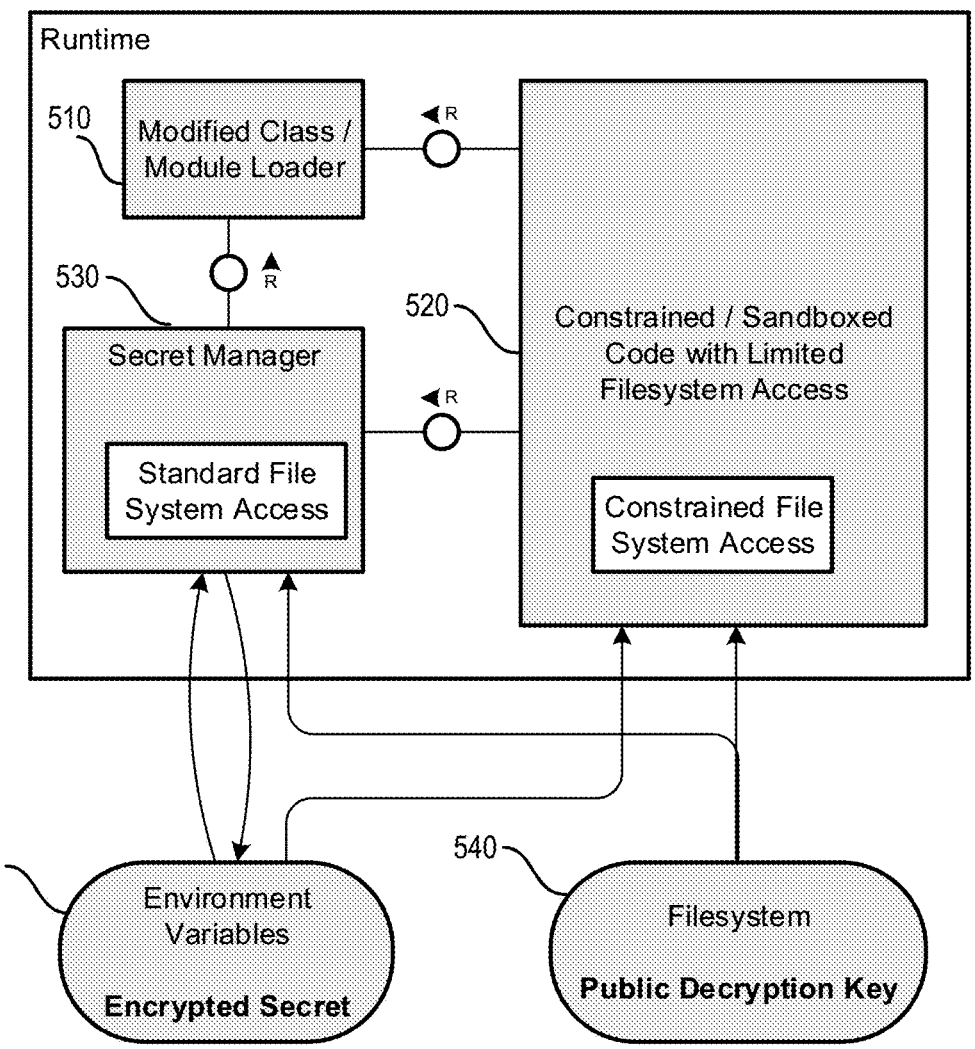
FIG. 5 is a fifth diagram illustrating a containerized application accessing environment variables.

FIG. 5 is a diagram 500 illustrating a secure store-based approach. Although the variation illustrated in FIG. 4 makes it more difficult for an attacker to obtain secrets encapsulated within the environment variables 120, there is still some residual risk. If an attacker somehow extracts the public key for an instance of a containerized application 120, then the attacker may use this key to decrypt VCAP_SERVICES content from any other instance that was deployed from the same container build. Due to the fact that building a container is somewhat time consuming/expensive, there is a preference to avoid building a new container per application instance.

However, there is a preference to avoid having an instance specific key pair and making the public key available to the container at runtime. This approach is to leverage the fact that containers run on top of a layered filesystem. Hence it is possible to alter some part of the container at deployment time by replacing one of these filesystem layers.

Figure 6:
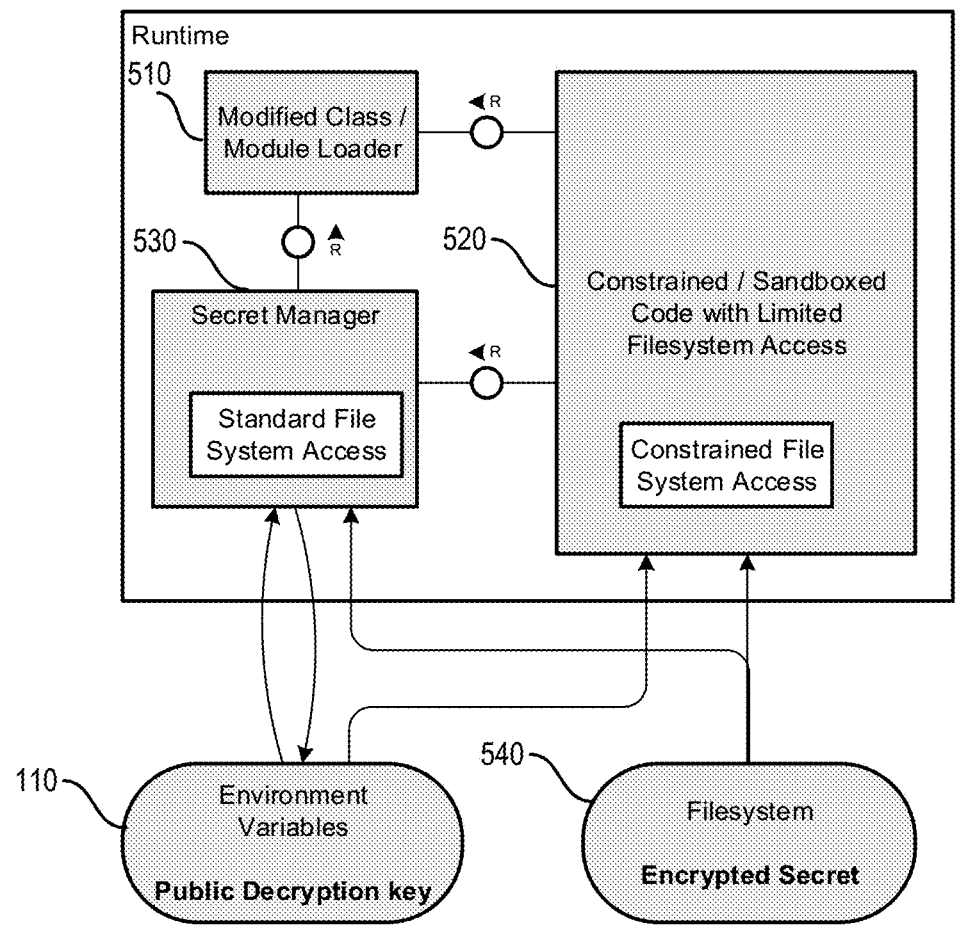
FIG. 6 is a sixth diagram illustrating a containerized application accessing environment variables.

Stated differently, with the examples of FIGS. 5 and 6, the secret manager 530 can read part of the filesystem 520 that the application cannot read (because the secret manager 530 runs with higher privileges). This restricted part of the filesystem 520 can contain the key used by the secret manager 530 to decrypt the environment variables 110. In another implementation the restricted filesystem 520 contains the secrets and the VCAP_SERVICE environment variables holds the key (see FIG. 6).

In both approaches the application has no means to get the key and the encrypted secrets. The application must always query the secret manager 530. The secret manager 530 can check which process is querying it. Thus, another process cannot easily call the secret manager 530 to get hold of the secrets.

The secret manager 520 can verify the caller by several means. For example, the caller can provide a (hard coded) token. In addition, or in the alternative, the secret manager 530 can look up the caller process in the operating system's process table. Only whitelisted processes will get secrets from the secret manager 530.

With most compiled languages, it can be more difficult for a malicious actor to add dynamic code to read the filesystem. With languages such as JAVASCRIPT or PYTHON, safeguards can be implemented to avoid an attacker dynamically injecting code. For example, with these languages, class/module loaders can be overwritten to ensure that a "normal" library code will not be able to access the filesystem in an unrestricted manner.

In a first variation, as illustrated in FIG. 5, the public decryption key can be injected into the filesystem 540 which can control how data is stored in and retrieved from the containerized application 120. A modified class/module loader 510 is a runtime module for interpreted languages running in the container. For cloud applications, typical languages include JAVA, NODE (JAVASCRIPT), PYTHON, etc. As some of the current schemes require that relevant, protected file-system parts are accessible only through the secret manager 530, the modification of the runtime is simply a restriction that prevents "normal" interpreted code from accessing the constrained/sandboxed code 520 (i.e., protected file-system parts) without going through the secret manager 520. Here the "secure store" is the data inside VCAP_SERVICES. The public key required to decrypt it will be stored inside a file that is injected to the filesystem as described above.

In a second variation as illustrated in diagram 600 of FIG. 6, the secrets can be injected into the filesystem 540. This variation takes into account that the key injection splits the secret into two parts (the keystore in VCAP_SERVICES and the public key) that are transported through environment variables 110 and the filesystem 120. In addition, the roles of these two channels may be reversed. That is, the secret credentials can be injected into the filesystem 540 and the public decryption key can then be stored in the VCAP_SERVICES environment variables 110.

Putting the public decryption key into the environment variable can be advantageous based on the assumption that access to the filesystem 540 is harder to achieve for an attacker. In other words, a public decryption key cannot be used by a malicious actor. An encrypted secret can, in some circumstances, be cracked by a malicious actor.

Figure 7:
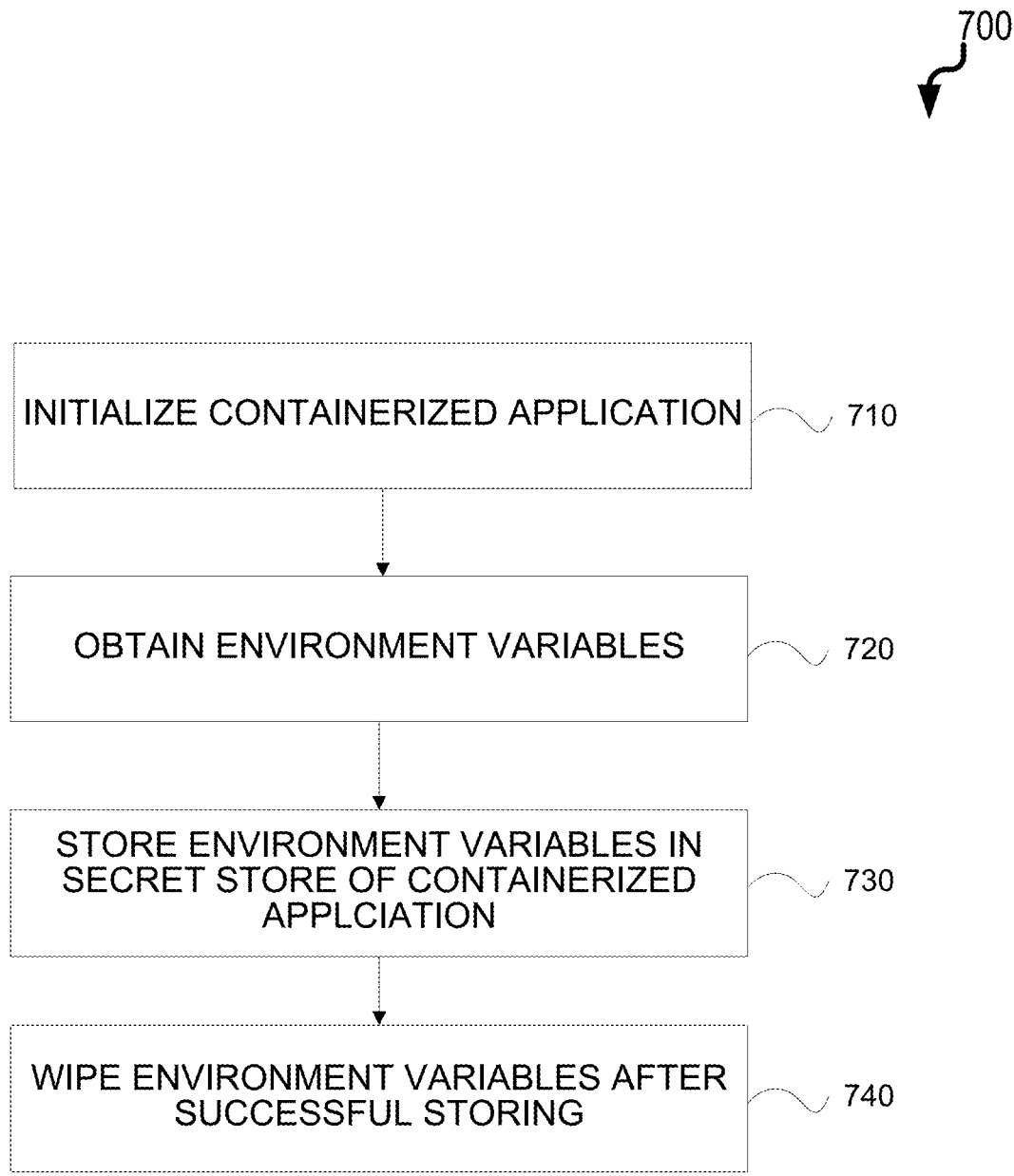
FIG. 7 is a process flow diagram illustrating enhanced security for a cloud computing framework.

FIG. 7 is a process flow diagram 700 in which, at 710, a containerized application is initialized in a cloud-based computing environment. Thereafter, at 720, environment variables encapsulating credentials are obtained by the containerized application. The containerized application then, at 730, stores the environment variables in a secret store of the containerized application. Upon completion of such storing, at 740, the environment variables are wiped.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    initializing, in a cloud-based computing environment, a containerized application;
    obtaining, by the containerized application, environment variables encapsulating credentials;
    storing, by the containerized application, the environment variables in a secret store internal to the containerized application,
    wherein the secret store runs with higher privileges than the containerized application; and wiping the environment variables upon completion of the storing of the environment variables.

2. The method of claim 1, further comprising:
encrypting the environment variables within the secret store.

3. The method of claim 2, further comprising:
spreading the environment variables within memory utilized by the secret store to obfuscate the encrypted environment variables.

4. The method of claim 1, wherein the environment variables comprise access credentials to the containerized application.

5. The method of claim 1,
wherein at least a portion of the environment variables are encrypted, and
wherein the method further comprises:
decrypting, by the containerized application, the encrypted environment variables using a corresponding symmetric key.

6. The method of claim 1,
wherein at least a portion of the environment variables are encrypted, and
wherein the method further comprises:
injecting a public decryption key into a filesystem of the cloud-based computing environment;
providing, by the filesystem, the public decryption key to the containerized application; and
decrypting, by the containerized application, data encapsulated within the environment variables using the provided public decryption key.

7. The method of claim 1,
wherein the environment variables comprise a public decryption key, and
wherein the method further comprises:
injecting an encrypted secret into a filesystem of the cloud-based computing environment;
providing, by the filesystem, the encrypted secret to the containerized application; and
decrypting, by the containerized application, the encrypted secret using the provided public decryption key.

8. A system comprising:
at least one data processor; and
memory storing instructions which, when executed by the at least one data processor, implements operations comprising:
initializing a containerized application;
obtaining, by the containerized application, environment variables encapsulating credentials;
storing, by the containerized application, the environment variables in a secret store internal to the containerized application,
wherein the secret store runs with higher privileges than the containerized application; and
wiping the environment variables upon completion of the storing of the environment variables.

9. The system of claim 8, wherein the operations further comprise:
encrypting the environment variables within the secret store.

10. The system of claim 9, wherein the operations further comprise:
spreading the environment variables within memory utilized by the secret store to obfuscate the encrypted environment variables.

11. The system of claim 8, wherein the environment variables comprise access credentials to the containerized application.

12. The system of claim 8,
wherein at least a portion of the environment variables are encrypted, and
wherein the operations further comprise:
decrypting, by the containerized application, the encrypted environment variables using a corresponding symmetric key.

13. The system of claim 8,
wherein at least a portion of the environment variables are encrypted, and
wherein the operations further comprise:
injecting a public decryption key into a filesystem of a cloud-based computing environment;
providing, by the filesystem, the public decryption key to the containerized application; and
decrypting, by the containerized application, data encapsulated within the environment variables using the provided public decryption key.

14. The system of claim 8,
wherein the environment variables comprise a public decryption key, and
wherein the operations further comprise:
injecting an encrypted secret into a filesystem of a cloud-based computing environment;
providing, by the filesystem, the encrypted secret to the containerized application; and
decrypting, by the containerized application, the encrypted secret using the provided public decryption key.

15. A non-transitory computer program product storing instructions which, when executed by at least one computing device, implements operations comprising:
initializing a containerized application;
obtaining, by the containerized application, environment variables encapsulating credentials;
storing, by the containerized application, the environment variables in a secret store internal to the containerized application,
wherein the secret store runs with higher privileges than the containerized application; and
wiping the environment variables upon completion of the storing of the environment variables.

16. The computer program product of claim 15,
wherein at least a portion of the environment variables are encrypted, and
wherein the operations further comprise:
decrypting, by the containerized application, the encrypted environment variables using a corresponding symmetric key.

17. The computer program product of claim 15,
wherein at least a portion of the environment variables are encrypted, and
wherein the operations further comprise:
injecting a public decryption key into a filesystem of a cloud-based computing environment;
providing, by the filesystem, the public decryption key to the containerized application; and
decrypting, by the containerized application, data encapsulated within the environment variables using the public provided decryption key.

18. The computer program product of claim 15,
wherein the environment variables comprise a public decryption key, and wherein the operations further comprise:
   injecting an encrypted secret into a filesystem of a cloud-based computing environment;
   providing, by the filesystem, the encrypted secret to the containerized application; and
   decrypting, by the containerized application, the encrypted secret using the provided public decryption key.

19. The method of claim 6, wherein the injected public decryption key is accessible through an associated secret manager.

20. The system of claim 17, wherein the injected public decryption key is accessible through an associated secret manager.

* * * * *